United States Patent [19]

Marx

[11] Patent Number: 4,564,994
[45] Date of Patent: Jan. 21, 1986

[54] MULTIPLE PLATE CLUTCH ORIENTING FIXTURE AND METHOD OF USING

[75] Inventor: John J. Marx, Warren, Mich.

[73] Assignee: Fraser Automation, Sterling Heights, Mich.

[21] Appl. No.: 544,081

[22] Filed: Oct. 21, 1983

[51] Int. Cl.[4] .............................................. B23Q 3/00
[52] U.S. Cl. ........................................ 29/468; 29/274; 29/281.4; 29/281.5; 269/47
[58] Field of Search ............................ 192/70.13, 70.2; 29/467, 468, 274, 271, 270, 281.1, 281.5, 464, 281.4; 269/47; 198/648, 464, 467

[56] References Cited

U.S. PATENT DOCUMENTS 1,592,105  7/1926  Harris et al. ..................... 192/70.2
4,231,147  11/1980  Witt ................................. 29/464 X
4,378,867  4/1983  Pasqualucci ..................... 192/70.13

FOREIGN PATENT DOCUMENTS 485518  5/1928  United Kingdom ................. 29/274

Primary Examiner—Howard N. Goldberg
Assistant Examiner—John T. Burtch
Attorney, Agent, or Firm—Harness, Dickey & Pierce

[57] ABSTRACT

A fixture useful for orienting a stack of clutch plates of a multiple disc clutch or brake assembly is disclosed. The fixture includes three major components. A base receives a stack of clutch plates. A mandrel interfits with the base and slidably mounts a fixture plate assembly. The fixture plate assembly includes a number of posts which cause the protruding teeth of the reaction plates to become aligned axially when the fixture plate is driven toward the base. Plate retention posts carried by the fixture plate assembly engage the reaction plates so that they can be removed from the base and installed within the associated structure while maintaining alignment.

3 Claims, 6 Drawing Figures

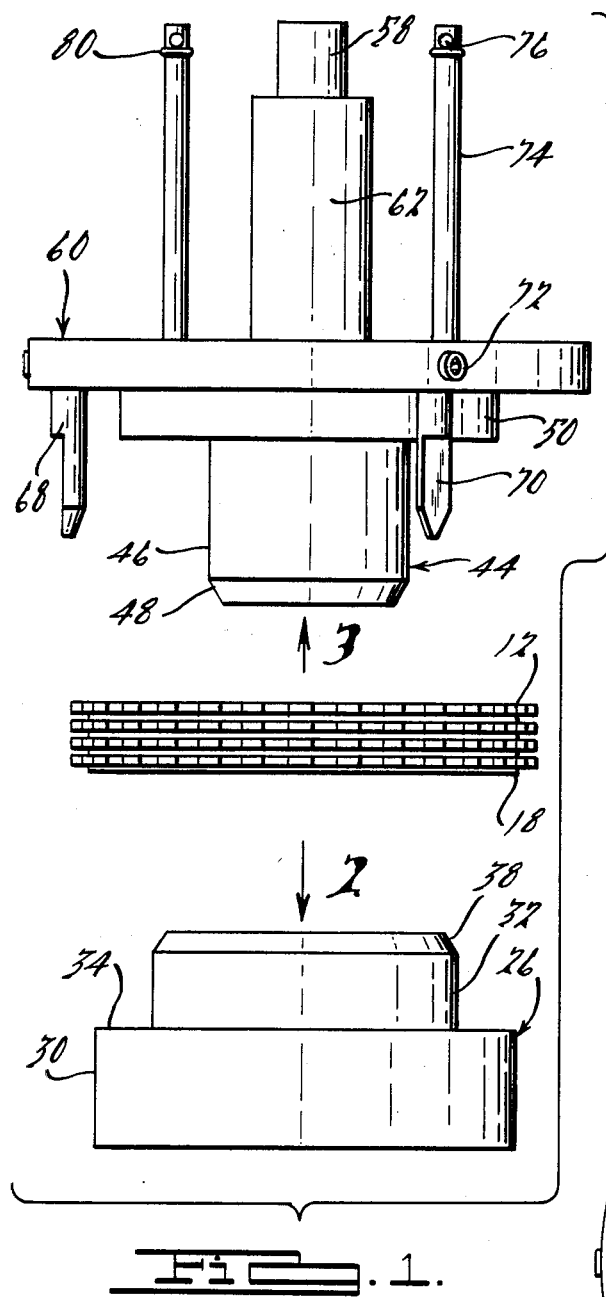
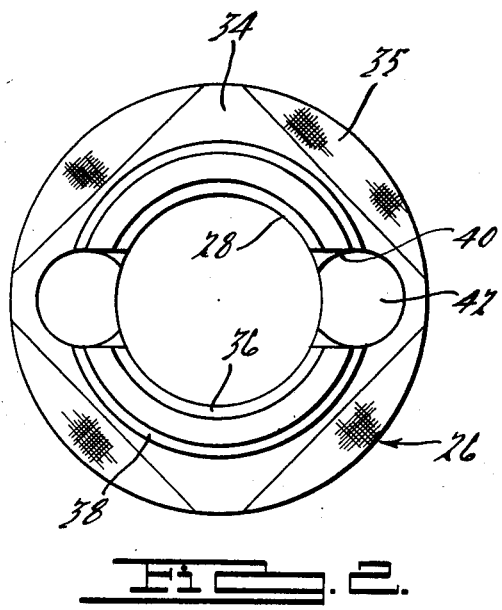
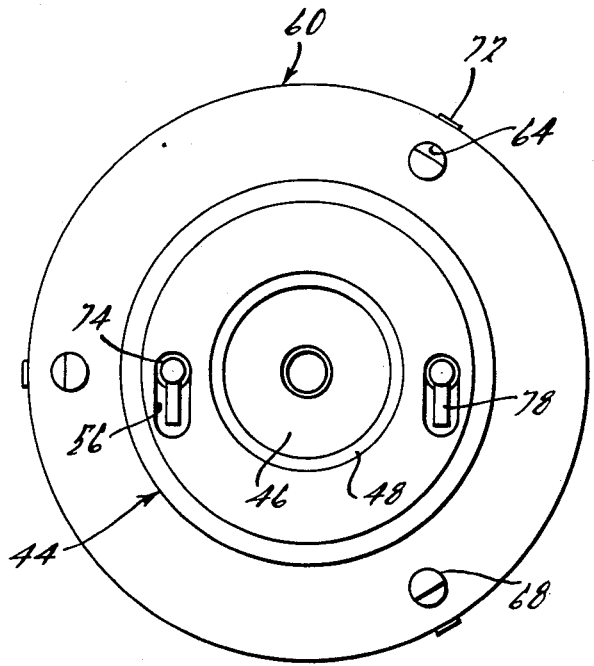

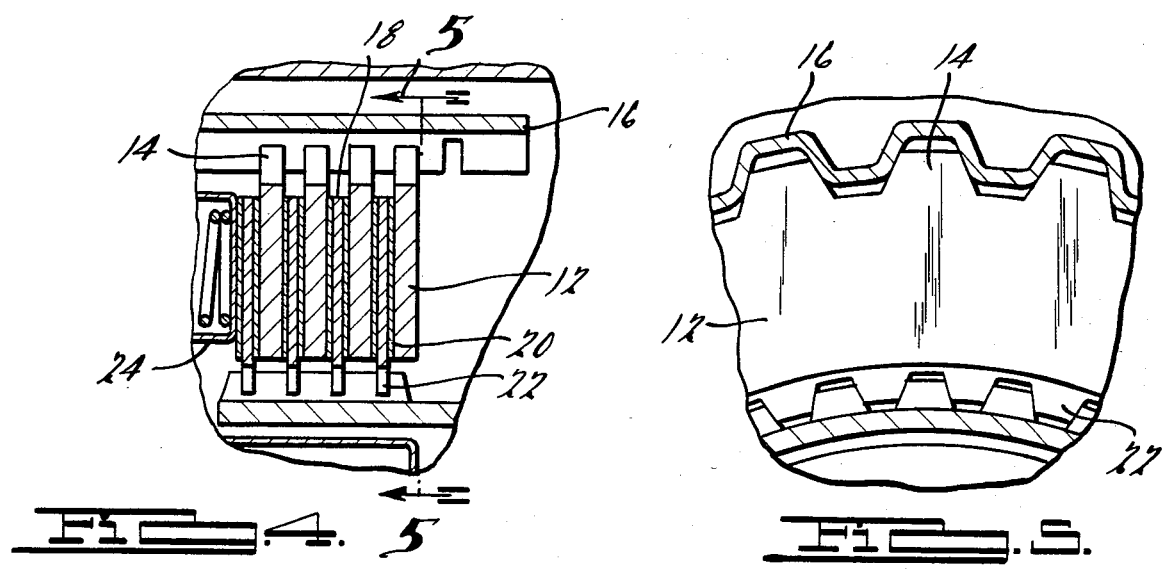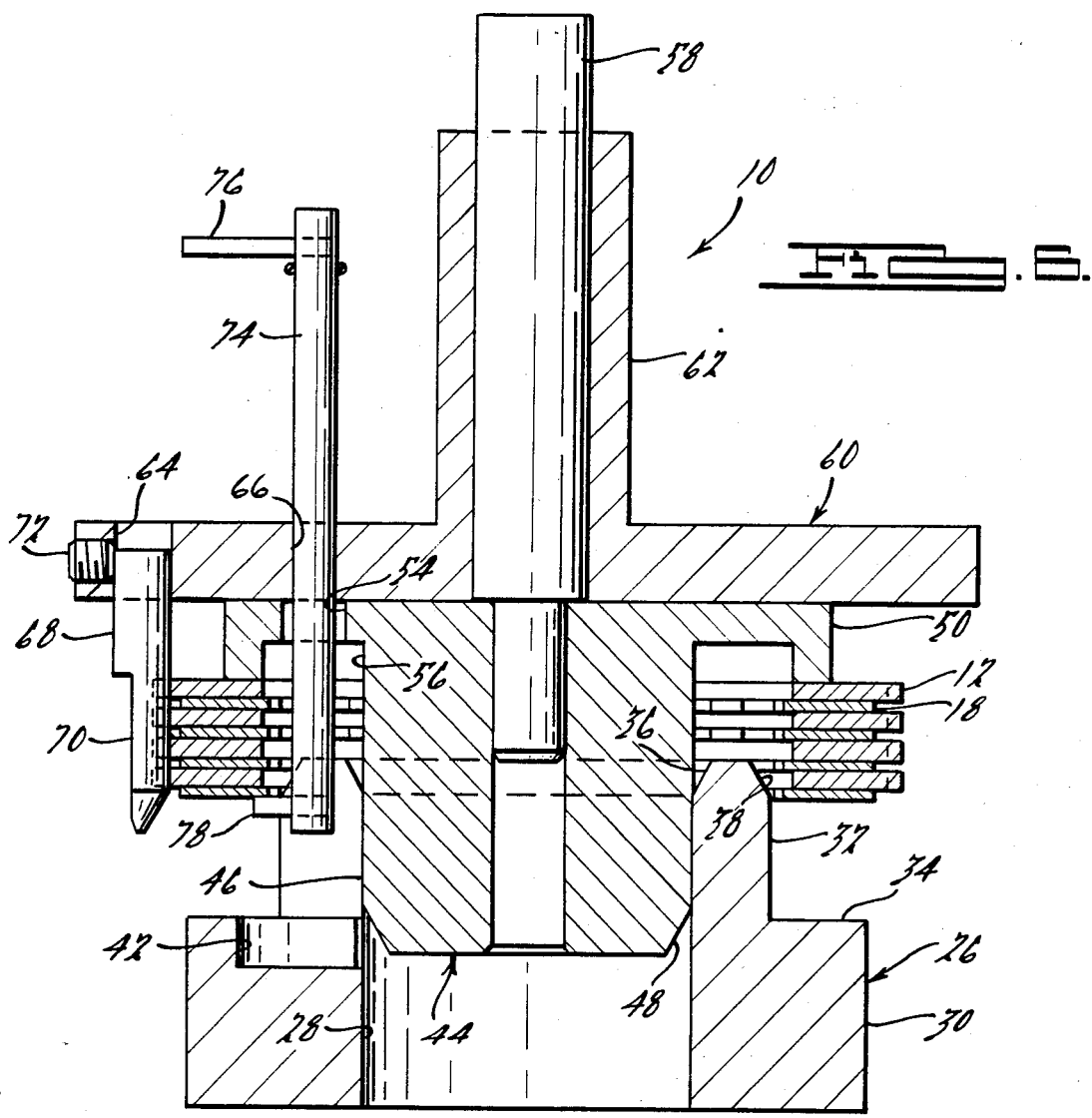

MULTIPLE PLATE CLUTCH ORIENTING FIXTURE AND METHOD OF USING

BACKGROUND AND SUMMARY OF THE INVENTION

This invention relates to an assembly fixture, and particularly to a fixture useful for orienting the plates of a multiple plate clutch or brake unit such that the assembly may be installed within the associated structure easily and quickly.

Multiple plate clutches and brakes are used in many applications where high-torque transmission and compact size are required. For example, multiple plate clutches are frequently used in motor vehicle automatic transmissions where they are employed selectively to cause a driven member to couple or uncouple with a housing ground or another driven member, thereby effecting changes in drive ratios. Multiple plate clutch assemblies are also employed to selectively couple or uncouple an engine output from the manually shiftable transmissions of the type typically used for motorcycles, thereby permitting gear changes. Irrespective of application, multiple plate clutches and brakes have a generally similar configuration. A plurality of reaction plates forming radially projecting teeth are used which engage an output or reaction drum member. Interposed between the reaction plates are drive plate assemblies which form radially projecting teeth which lngage a splined surface of a driven shaft. Both the reaction and the drive plates are longitudinally slidable such that an externally applied longitudinal load selectively exerts a clamping load thereby causing engagement or disengagement between the adjacent plates. Therefore, the driven member can be selectively coupled and uncoupled with the reaction member. Typically, a layer of friction material is interposed between the surfaces of the reaction and drive plates which are normally formed from sheet metal stock. Also, it is typical for the entire unit to be submersed within a bath of lubricating fluid which provides a cooling effect.

During the assembly process of multiple plate clutch and brake assemblies, it is necessary to orient the plate assemblies such that they can be loaded into the associated output or reaction drum. This process requires that the radially outwardly extending teeth formed by the reaction plates are in registry with the associated grooves formed by the output or reaction drum. According to the teachings of the prior art, each reaction plate and drive plate is individualy assembled within the output or reaction drum or the associated structure one piece at a time, permitting the operator to properly orient the reaction plates within the housing. This process is labor intensive, leading to high assembly cost and production time constraints.

A principal aspect of this invention is to provide a fixture which significantly reduces the time necessary to assemble a multiple plate clutch unit and to install it into the associated structure. This advantage is achieved by providing a fixture which orients the radially projecting teeth of the reaction plates such that they are in axial registry with one another thereby allowing them to be installed within the associated structure easily and quickly.

The advantages of the subject invention are achieved by providing a fixture having three primary components. A base member receives the reaction and drive plates and insures that their centers are coaxially aligned. A mandrel fits within the base member and forms an extending rod which slidably receives the plate member. A fixture plate assembly includes a plurality of extending orienting posts which engage the radially extending teeth of the reaction plates and aligns them in axial registry with one another when the fixture plate assembly is slid with respect to the mandrel toward the base member. Retention means are incorporated into the fixture plate assembly for grasping the assembled multiple plate assembly permitting the unit to be transported from base member into position with the associated drum or housing structure. The apparatus disclosed herein is adapted to be manually operated and is also suitable to be actuated by machine.

Additional benefits and advantages of the present invention will become apparent to those skilled in the art to which this invention relates upon a reading of the described preferred embodiments of this invention taken in conjunction with the accompanying drawings.

DESCRIPTION OF THE DRAWINGS

FIG. 1 is an exploded side elevational view of the multiple plate clutch assembly fixture according to this invention shown with the associated multiple plate clutch unit;

FIG. 2 is a top elevational view of the base member shown in FIG. 1;

FIG. 3 is a view of the bottom of the plate and mandrel structures shown in FIG. 1;

FIG. 4 is a side cross-sectional view taken through a typical multiple plate clutch assembly with which this invention is advantageously practiced;

FIG. 5 is a partial sectional view of the multiple plate clutch assembly shown in FIG. 4 taken along line 5—5 of that Figure; and FIG. 6 is a side cross-sectional view of the fixture according to this invention shown with the associated multiple disc clutch assembly.

DETAILED DESCRIPTION OF THE INVENTION

A multiple plate clutch assembling fixture according to this invention is generally designated by reference character 10 and is shown particularly by FIGS. 1 and 6. FIGS. 4 and 5 illustrate a typical configuration of a multiple disc clutch or brake assembly. With reference to FIGS. 4 and 5, a plurality of reaction plates 12 having outwardly radially projecting teeth 14 are provided which engage a cooperatively shaped surface formed by an output or reaction drum 16. Teeth 14 of reaction plate 12 are regularly spaced such that the reaction plate may be loaded within drum 16 in any number of angular positions provided that teeth 14 engage corresponding grooves formed by drum 16. Teeth 14 function to prevent relative rotation between reaction plate 12 and drum 16. Interposed between reaction plates 12 are drive assemblies 18. Drive plate assemblies 18 of the type typically employed in an automatic transmission include a layer of friction material 20 on both sides thereof. Drive plate assemblies 18 form redially inwardly directed teeth 22 which engage a driven shaft having a cooperatively shaped external surface forming a spline. Actuator member 24 shown as a spring biasing element in FIG. 4 is employed to selectively clamp and unclamp reaction plate 12 and drive plate 18 assemblies such that they are frictionally coupled or allowed to rotate relative to one another. The reaction plate 12 furthest to the right with respect to the orientation shown in FIG. 4 is prevented from moving longitudinally by a stop, therefore, forces exerted by actuator member 24 cause a clamping load to exist between drive plate assemblies 18 and reaction plates 12. As is evident with reference to FIG. 5, teeth 14 formed by reaction plate 12 must be oriented in axial registry with the grooves formed by drum 16. This requirement has required that assembly conducted in accordance with the prior art involves separately loading each reaction plate 12 and drive plate assembly 18 into drum 16.

With particular reference to FIGS. 1, 2, 3 and 6, multiple plate asembling fixture 10 according to this invention includes base member 26. Base member 26 is an annular ring having a stepped external diameter and internal bore 28. First diameter portion 30 is larger in diameter than second diameter portion 32. A shoulder 34 is formed between the diameter portions 30 and 32. Shoulder 34 forms a surface roughened by knurling or by the application of a layer of rough surfaced material designated by reference character 35. Internal chamfer 36 formed by the terminal end of second diameter portion 32 causes the bore 28 to have a fluted opening. External chamfer 38 causes second diameter portion 32 to have a conical external configuration adjacent its end surface. Base member 26 includes an axially extending lateral groove 40 formed within second diameter portion 32 extending to shoulder 34. Base member 26 further forms circular cutouts 42 formed at the base of groove 40 within shoulder 34.

Mandrel 44, best shown with reference to FIGS. 1 and 6, includes circular body portion 46 having an external diameter which permits the mandrel member to be slidably received by base member internal bore 28. Body portion 46 includes chamfer 48 which simplifies loading into bore 28 by providing a self-aligning action. Circular flange 50 is affixed to the top of body 46 or is formed integral therewith. Flange 50 includes two bores 54 having oblong apertures 56 machined into the lower surface of the flange. Mandrel 44 further includes center post 58 extending from flange 50 which may be formed by assembled individual components or formed integral with the mandrel.

Fixture plate assembly 60 includes sleeve 62 which slidably engages mandrel center post 58. Fixture plate assembly 60 forms a plurality of radially spaced bores 64 located near the radial extremity and a pair of opposing bores 66 which are located in an intermediate radial position. Within bore 64 are disposed teeth aligning posts 68 having a circular cross-section and downwardly directed pointed ends. Teeth aligning posts 68 further include flattened radially outwardly projecting surfaces 70. Teeth engaging posts 68 are preferably secured within bores 64 by threaded fasteners 72 such as are shown in FIG. 1. Located within bores 66 are plate engaging rods 74. Each of the plate retaining rods 74 include bores perpendicular to their longitudinal axis near their ends within which roll pins 76 and 78 are installed. Roll pin 76 permits plate engaging rods 74 to be rotated and roll pin 78 engages the clutch plates in a manner which will be described subsequently. O-rings 80 are installed on plate engaging rods 74 forming a detent for their lowering into bore 66.

In operation, drive plate assemblies 18 and reaction plates 12 are stacked upon base member second diameter portion 32. These members are easily placed upon second diameter portion 32 since external chamfered portion 38 forms a guide for their positioning. Second diameter portion 32 tends to locate the plates concentrically. Second diameter portion 32 is constructed to have sufficient axial height such that the clutch plate assembly height is below the point at which the diameter decreases due to chamfer 38. Next, mandrel 44 is lowered onto base 26 such that body portion 46 engages base member bore 28. Also, mandrel 44 is oriented such that plate engaging rods 74 are in registry with base lateral groove 40. Upon the sliding of fixture plate assembly 60 downwardly with respect to mandrel body 46 aligning posts 68 are caused to engage the radially outwardly extending teeth 14 of plate assemblies 12. The radius of the inner surface of teeth engaging posts 68 are less than the outer radius of projecting teeth 14 but slightly greater than the surface forming the root of the teeth such that the teeth engaging posts tend to line up the teeth. The sharpened points of teeth engaging posts 68 tend to cause the plates to become oriented such that the post may be slid downward thereby placing the teeth 14 in axial registry with one another from plate to plate. The process of aligning teeth 14 is facilitated if fixture plate assembly 60 is slightly rotated or vibrated with respect to base member 26 as post members 68 are driven. The roughened surface of shoulder 34 tends to prevent rotational sliding of the plate it contacts such that fixture plate assembly 60 may be rotated with respect to reaction plates 12. Once fixture plate assembly 60 is moved downwardly to the extent possible, plate engaging rods 74 are forced downward until roll pin 78 is within cutout 42 at which time the plate engaging rod is rotated such that roll pin 78 extends radially outwardly. In this configuration, when plate engaging rods 74 are withdrawn, roll pin 78 engages the bottom plate assembly enabling mandrel member 44 and fixture plate assembly 60 may be withdrawn from the base member while retaining the reaction and drive plates 12 and 18, respectively, in alignment.

FIG. 6 illustrates the mandrel member 44 and the fixture plate assembly 60 being withdrawn from base 26. The assembly is next loaded into the associated structure where plate engaging rods 74 are again rotated permitting fixture 10 to be withdrawn. Once installed, the splined drive member is slowly inserted and rotated in order to align drive plate assemblies 18.

While preferred embodiments of the invention have been described herein, it will be appreciated that various modifications and changes may be made without departing from the spirit and scope of the appended claims.

I claim:

1. A fixture for orienting clutch plates having radially projecting teeth, said clutch plates forming part of a multiple plate clutch or brake assembly comprising: a base member forming first and second diameter portions, said first diameter portion substantially larger than the second diameter portion and forming a shoulder portion therebetween, said base member having a central bore, said first diameter portion having axially extending cutout portions extending to said shoulder, a mandrel having an annular body portion slidably fitting within said base member central bore, a flange attached to said body portion and a central post, said flange forming a pair of opposing bores located at a radially intermediate position, a fixture plate member having a sleeve slidable on said mandrel center post, said fixture plate member carrying a plurality of clutch plate engaging posts and two or more bores, said clutch plate engaging posts forming pointed ends and being positioned radially to engage said clutch plates teeth for effecting axial alignment of said teeth of a stack of said clutch plates when said fixture plate assembly is driven toward said base, and two or more plate emgaging posts fitting within said fixture plate bores, said plate engaging posts having means for engaging said clutch plates, said plate engaging posts being slidable and rotatable within said flange bores for bringing said pins selectively into engagement with said clutch plates.

2. The fixture according to claim 1 wherein said clutch plates include reaction plates and drive plates, a plurality of said reaction plates alternately stacked with a plurality of said drive plates.

3. A method for using a fixture for orienting and installing a plurality of clutch plates having radially extending teeth within an associated structure, said clutch plates forming a part of a multiple plate clutch or brake assembly comprising the steps of: stacking a plurality of said clutch plates, simultaneously aligning the teeth of said clutch plates and radially locating said clutch plates using said fixture engaging the aligned stack of said clutch plates for retaining said clutch plates together, assembling said clutch plates into said associated structure, disengaging said clutch plates and removing said fixture from said clutch plates.

* * * * *